Patented June 17, 1941

2,246,299

UNITED STATES PATENT OFFICE 2,246,299

DIACETYL FROM METHYL VINYL KETONE

Ernst Eberhardt, Ludwigshafen-on-the-Rhine, and Robert Stadler, Heidelberg, Germany, assignors to I. G. Farbenindustrie Aktiengesellschaft, Frankfort-on-the-Main, Germany No Drawing. Application July 19, 1940, Serial No. 346,368. In Germany October 10, 1939

5 Claims. (Cl. 260—593)

This invention relates to a chemical process. More particularly, it relates to a new process for the preparation of diacetyl, (2,3-butanedione).

It is an object of this invention to discover a new process for making diacetyl. Another object is the production of diacetyl from methyl vinyl ketone. Other objects will become apparent hereinafter.

These objects have been accomplished by the discovery that diacetyl can be obtained in good yield by heating with a dilute mineral acid, addition compounds of hypochlorous acid and methyl vinyl ketone. The addition compounds may be made and isolated before treatment with the dilute acid. However, it is possible to carry out the addition of hypochlorous acid and methyl vinyl ketone in aqueous solution and then heat with dilute mineral acid without isolation of the addition compounds. In this way, diacetyl can be made from methyl vinyl ketone in a single continuous operation.

In order that the process may be more fully understood, the following specific examples are given by way of illustration, but the invention is not limited thereto as will become more apparent hereinafter. In the following examples, "parts" means "parts by weight."

Example I

Chlorine, in the amount of 71 parts, is introduced into a solution of 70 parts of methyl vinyl ketone in 1000 parts of water with good agitation at a temperature of about 0° C. to 5° C. The solution is then extracted with ether several times after having stood for 2 hours and after salting with sodium chloride. After collecting the extract and distilling off the ether, an oil is obtained which is heated with 500 parts of water and 100 parts of concentrated hydrochloric acid for about 4 hours at about 90° C. From the thus obtained yellow solution, diacetyl is distilled. The yield amounts to 35 parts of diacetyl.

Example II

Chlorine, in the amount of 71 parts, is introduced into a solution of 70 parts of methyl vinyl ketone in 1000 parts of water with good agitation at a temperature of from about 0° C. to about 10° C. Agitation is continued for 2 hours. The solution is heated for 4 hours at 90° C. and the diacetyl which is formed is distilled off from the yellow solution thus obtained. The yield is about 50 parts of crude diacetyl.

Example III

Methyl vinyl ketone, in the amount of 70 parts, is mixed with a suspension of 500 parts of boric acid in 500 parts of water and 500 parts of a sodium hypochlorite solution containing 12 per cent active chlorine is introduced over a period of 2 hours with good agitation. The reaction mixture is further agitated at 0° C. for 4 hours. The temperature is then allowed to rise to about 20° C. and 184 parts of concentrated sulfuric acid is added. The reaction mixture is maintained at about 100° C. for 4 hours and, from the resulting yellow solution, diacetyl is distilled. The yield is about 64 parts of crude diacetyl.

Example IV

A sodium hypochlorite solution (600 parts) containing 12 per cent active chlorine is slowly flowed in, with agitation, a mixture of 300 parts of water and 70 parts of methyl vinyl ketone at 0° C. while passing carbon dioxide through the mixture. The reaction mixture is further agitated for about 12 hours and 180 parts of concentrated sulfuric acid is added. After the reaction mixture has stood at about 100° C. for 4 hours, the resulting yellow solution is distilled and 64 parts of crude diacetyl is obtained.

The reaction of hypochlorous acid with methyl vinyl ketone may be carried out by any suitable method. Thus, the hypochlorous acid may be formed in situ by the addition of chlorine to an aqueous solution of methyl vinyl ketone or by the use of an acid and an alkali hypochlorite. Alternatively, the hypochlorous acid may be made before the addition of methyl vinyl ketone. The temperature of this addition reaction is preferably kept low (for example, 0° C. to 10° C.) in order to prevent the decomposition of hypochlorous acid and the reaction is preferably carried out in dilute solution for the same reason, but these conditions are not critical.

The treatment of the addition products with a mineral acid is effected at elevated temperatures, from 90° C. to 100° C. having been found very satisfactory. The time of heating depends upon the temperature employed, the concentration of reactants, etc. In general, from 2 to 4 hours has proved satisfactory. It is to be understood, however, that, while the preferred times and temperatures for good yields have been set forth, the invention is not limited thereto.

The product, diacetyl, is preferably isolated by fractional distillation. However, any known method of isolation may be used, such, for example, as extraction, salting out, etc.

Diacetyl is a chemical compound of unusual interest. It is an intermediate for heterocyclic compounds, unsaturated diamides, etc. It is, thus, useful in the arts of dyeing, pharmaceuticals, etc.

As is readily apparent, the invention is not limited to the specific examples, but suitable changes may be made without departing from the spirit and scope thereof. Accordingly, it is not intended to be limited except as indicated in the appended claims.

We claim:

1. Process for the production of diacetyl which comprises heating, with a dilute mineral acid, the addition products of methyl vinyl ketone and hypochlorous acid.

2. Process for the production of diacetyl which comprises heating, with a dilute mineral acid, the addition products of methyl vinyl ketone and hypochlorous acid, and separating out the resulting diacetyl.

3. Process for the production of diacetyl which comprises reacting methyl vinyl ketone with hypochlorous acid and heating the resulting reaction mixture with a dilute mineral acid.

4. Process for the production of diacetyl which comprises reacting methyl vinyl ketone with hypochlorous acid, heating the resulting reaction mixture with a dilute mineral acid, and separating out the resulting diacetyl.

5. Process for the production of diacetyl which comprises reacting methyl vinyl ketone with hypochlorous acid, separating out the oily products, heating said products with dilute mineral acid, and separating out the resulting diacetyl.

ERNST EBERHARDT.
ROBERT STADLER.